Nov. 17, 1942.     E. M. DONS ET AL     2,302,428
APPARATUS FOR SEPARATING CONSTITUENTS OF OILS AND WAXES
Filed March 27, 1940
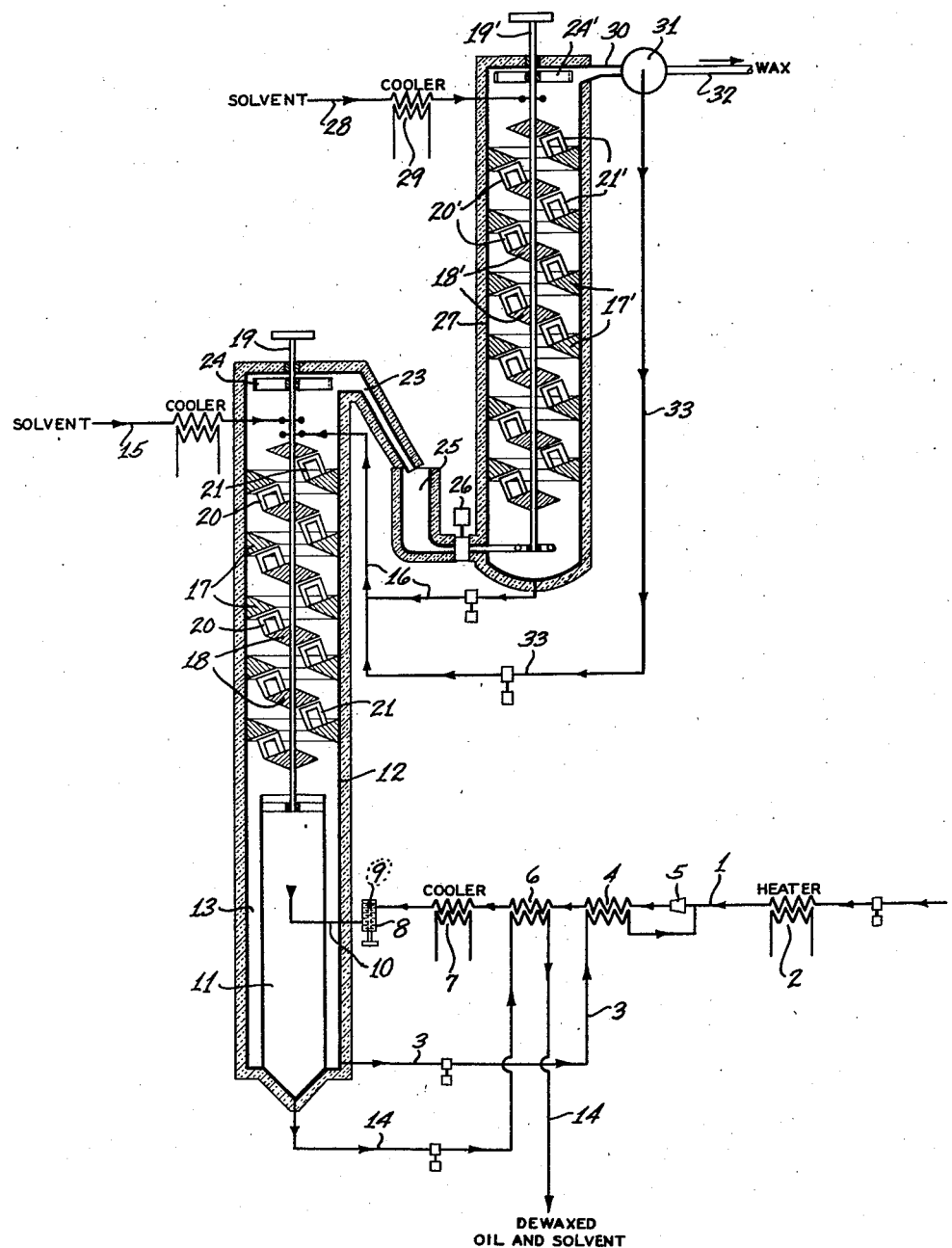
INVENTORS
E. M. DONS
O. G. MAURO
BY Albert J. McCauley
ATTORNEY.

Patented Nov. 17, 1942

2,302,428

UNITED STATES PATENT OFFICE 2,302,428

APPARATUS FOR SEPARATING CONSTITUENTS OF OILS AND WAXES

Eddie M. Dons and Oswald G. Mauro, Tulsa, Okla., assignors to Mid-Continent Petroleum Corporation, Tulsa, Okla., a corporation of Delaware Application March 27, 1940, Serial No. 326,159

8 Claims. (Cl. 196—46)

This invention relates to apparatus for separating constituents of oils and waxes. The invention may be employed in separating wax and oil found in various kinds of materials including mineral oils, petrolatum, slack wax and vegetable waxes. It can be conveniently used in dewaxing petroleum lubricating oils to produce low pour point lubricants, or in obtaining high melting point waxes from petrolatum, and in purifying slack wax, as well as in the refining of oils to extract selected constituents.

Prior to our inventions in this art, the well recognized commercial systems for separating wax involved the operations of cold settling, centrifuging or filtering to separate the wax from oil. In modern refinery practice the previous systems regarded as most efficient include means for chilling a solution of oil and solvent to precipitate the wax, and thereafter passing the solution through a filter to separate the precipitated wax.

Another phase of the old wax-separating systems appears in the high cost of dewaxing equipment wherein a large filtering plant is relied upon to separate the mass of precipitated wax from the diluted oil. The usual filters are quite expensive and special care and attention is required in the operation of the filtering plant. This is true when normally liquid solvents employed, and the cost is, of course, materially increased in a plant designed for normally gaseous solvents. Aside from the expense involved in such plants, the popular solvents usually regarded as most desirable in the chilling and filtering apparatus, are inflammable and explosive materials requiring special precautions, and always a source of danger.

Furthermore, the filtering operations do not remove all of the oil from the wax. The large mass of precipitated wax is usually deposited on the filter in the form of clusters of interlocked wax crystals with oil-retaining cavities inside of the clusters, and additional bodies of diluted oil are trapped between the clusters on the filter. A substantial percentage of the oil is thus retained in the mass of wax.

Therefore, an object of the present invention is to generally improve this art by producing a commercially feasible dewaxing apparatus having advantages not found in the modern dewaxing systems. An object is to avoid the expense and trouble heretofore involved in the use of extremely large filters to separate the body of diluted oil from the wax, at the same time providing a less expensive system wherein the oil is more effectively removed from the wax particles.

Another object is to provide a single dewaxing system adapted to very efficiently separate various different types of wax-containing materials, including viscous residues and comparatively light distillates, thereby overcoming a serious objection to the usual commercial systems which lack the desired flexibility and fail to provide a normal efficiency or economy in dewaxing the different products.

We can also avoid the troublesome operating conditions, such as requirements for a critical rate of chilling, or very gradual chilling, involved in the use of some of the modern solvents. The economy of very rapid chilling and practically instantaneous precipitation of wax can be obtained in the new apparatus.

More specifically stated, an object is to obtain all of these advantages in a very simple continuous system wherein the wax is most effectively separated and thoroughly cleansed while it is in transit from the precipitating station to a recovery station.

With the foregoing and other objects in view, the invention comprises the novel construction, combinations and arrangement of parts hereinafter more specifically described and shown in the accompanying drawing, which illustrates one form of the invention. However, it is to be understood that the invention comprehends changes, variations and modifications within the scope of the claims hereunto appended.

Briefly stated, the preferred form of the invention includes the apparatus for precipitating the wax in a solution, extracting the main body of solution from the wax, and thereafter subjecting the wax to a cleansing operation wherein the traces or films of solution are forcibly removed from the wax.

At an initial stage, the wax-bearing material may be dissolved in a solvent and then cooled to precipitate wax particles in the solution. The density of the cooled solution is preferably greater than the density of the wax particles. The viscosity of the cooled solution, and the interfacial tension existing between said wax particles and the solution, are preferably low enough to allow the wax to freely rise in the solution.

At a subsequent stage, there is a preliminary separation due to the differences in specific gravity, the relatively dense solution moving downwardly while the wax particles rise in the solution, carrying with them relatively small portions of the solution. At this stage, the rising wax particles may be surrounded by films of the oil solution, and additional portions of the solution will be distributed throughout the mass of wax particles.

This condition is preferably followed by a cleansing operation which separates oily solution from the wax particles to produce a mass of clean wax, free of the oil, etc. For example, a descending stream of oil-solvent may be transmitted through the rising mass of wax particles, so as to forcibly scrub each wax particle, thereby dissolving the oily films and removing them from the wax particles, at the same time dissolving the relatively free portions of oil or solution carried by the mass of wax. The rising wax particles are thus subjected to a most effective cleansing action, and thereafter discharged from the descending solvent. As a consequence, the wax can be obtained in a remarkably clean and pure condition, far superior to the condition of the wax obtained in the modern filtering apparatus.

The process herein disclosed is more fully described and claimed in an application for patent filed by us on March 27, 1940, Serial No. 326,158.

The accompanying drawing is a diagrammatical view of a system which may be employed to carry out one form of the invention.

A continuous stream of the wax-bearing charging stock, for example, a lubricating oil stock, enters the system through a pipe 1 which may be provided with a heater 2. A continuous stream of dewaxing solvent, from a source to be hereafter described, is conducted through a pipe 3 and heat exchanger 4 to the oil supply pipe 1. The continuous streams of heated oil and solvent are united in the pipe 1 and transmitted through a mixing nozzle 5 where the oil and solvent are mixed at a temperature high enough to form the desired solution.

The continuous stream of solution is transmitted through a heat exchanger 6 for additional cooling. Thereafter, the stream of solution passes through a cooler, or chiller, 7 where the flowing solution is cooled to a temperature desired for precipitation of wax therein.

If desired, the resultant mixture of solution and precipitated wax may be transmitted into comminuting device 8 including a rotary breaker 9 whereby the wax is forcibly divided into minute particles suspended in the chilled solution to form an approximately homogeneous slurry of wax and said solution. A pipe 10 conducts a continuous stream of the wax particles and solution into a settling compartment, or dewaxing compartment, 11 surrounded by the lower portion of a separating chamber 12. This chamber 12 may be in the form of an upright column covered with insulation. Its lower portion may be separated from and concentric with the inner settling compartment 11, so as to form an annular settling compartment 13 around said inner compartment. In this form of the invention, the settling compartments 11 and 13 provide a pair of settling zones immediately below and in free communication with a cleansing compartment hereafter described.

The incoming stream of chilled solution and wax particles may be delivered from the pipe 10 to the settling or dewaxing compartment 11 at approximately the temperature selected for precipitation of wax in the cooler, or chiller, 7. For example, this temperature may be about 0° F., and we prefer to insulate the chamber 12 so as to maintain the desired extracting and cleansing temperatures therein, as this avoids the necessity of providing a cooling jacket around the chamber. In fact, an advantage is gained by avoiding excessive cooling of the walls of said chamber, as such cooling would tend to produce an adhesive condition in the wax at said walls, thereby interfering with the desired free movements of the wax.

We are assuming that a relatively dense solvent has been selected for this operation, and that the viscosity and interfacial tension are low enough to allow the wax particles to freely rise in the dense solution. In this event, the major portion of the dense solution will freely move downwardly to the bottom of the settling or dewaxing compartment 11 where it is discharged through a pipe 14. This outgoing solution is free of wax and it may be distilled in any suitable manner to remove the solvent from the dewaxed oil. However, before leaving the dewaxing system, it can be conveniently transmitted through the heat exchanger 6 to aid in cooling the incoming solution. It will be observed that most of the oil is very easily, quickly and economically dewaxed in the simple settling compartment 11, and immediately discharged from the dewaxing system.

Attention is now directed to the separating zone, or extracting zone established near the point where the incoming mixture of solvent and wax enters the settling compartment 11. The mass of wax particles move upardly and carry with them portions of the solution, including oily films around the wax particles and relatively free portions of the solution between the rising wax particles. However, this rising mass moves through the open top of the settling compartment 11 and passes through a relatively heavy descending stream which may be produced by continuously introducing streams of cleansing solvent through pipes 15 and 16 leading into the upper portion of the column 12. It will be understood that the cleansing solvent has the previously mentioned requirements as to density, viscosity and interfacial tension, and that it will readily dissolve the oil without dissolving the wax.

Therefore, the stream of cleansing or deoiling solvent will freely descend in direct contact with the rising stream of wax particles, so as to dissolve the free portions of oil solution carried by the wax, and also forcibly scrub the oily films from the rising wax particles. This deoiling action may be aided by any suitable mechanical appliances. For example, the cleansing or deoiling compartment in the upper portion of the column 12 may be provided with alternating baffles including a series of rings 17 extending inwardly from the inner face of the column 12 and a series of central baffle members 18 arranged as shown in the drawing to produce an elongated tortuous passageway wherein the rising wax particles move back and forth in a zigzag course. This tortuous deoiling passageway is free of violent artificial disturbance that would impair the natural cleansing flow due to different specific gravities of the counterflowing streams. The stream of cleansing solvent descends through the rising stream of wax particles, and the counterflowing streams are divided into numerous layers of different specific gravities contacting with each other and advancing in intersecting paths as they flow from one baffle to another. These baffles are preferably provided with upwardly inclined top and bottom faces to permit free movement of the rising wax particles. It will be observed that the rising layers of wax particles move upwardly while in contact with the upwardly inclined faces, and that said wax particles intersect the descending solvent while rising from one upwardly inclined plane to another.

This feature tends to prevent the wax particles from clinging to the baffles. However, any suitable mechanical means may be employed to prevent or limit the growing of wax crystals which might otherwise extend from the bottom faces of the baffles. For example, the central baffles 18 may be fixed to a rotary shaft 19, so as to rotate with the shaft, and scrapers 20 may extend from the top faces of these rotary baffles to remove waxy materials from the bottoms of the stationary baffle rings 17. These stationary baffles may be likewise provided with scrapers 21 extending from their top faces to remove waxy material from the bottom faces of the rotating baffles. In each case, the scrapers extend from the top of one baffle to a point adjacent to the bottom of the next higher baffle. It is not necessary to forcibly scrape the baffles, the object being to limit the thickness of any wax deposit tending to grow on the baffles.

An interesting feature appears in the effective cleansing of the rising wax particles due to the forcible scrubbing and dissolving action of the descending solvent which repeatedly crosses the path of the wax in the cleansing compartment. Attention is also directed to the unique condition at the lower portion of this cleansing zone where the descending solvent is diverted from the top of the settling compartment 11. This deflection of the descending solvent is due partly to the upward force of the rising stream of wax particles issuing from the top of said compartment 11, and partly to the descending current in the outer settling compartment 13. The lowermost central baffle 18 also tends to deflect the descending solvent toward the outer compartment 13. Some of the wax particles may be swept into the settling compartment 13, but these wax particles are so light that they will eventually rise in the heavy solvent and return to the mass of wax, instead of passing to the bottom of said settling compartment 13.

The heavy cleansing solvent performs an important function in removing oil carried by the wax particles. However, most of the oil is removed from the wax in said initial settling chamber 11, so the cleansing solvent stream which descends through the settling chamber 13 contains only a small percentage of oil. Therefore, this reasonably fresh body of solvent can very conveniently be used in a preceding stage of the process. For example, it may be continuously transmitted from the bottom of the settling chamber 13 through the pipe 3 to the heat exchanger 4, and thence to the continuous incoming stream of wax-bearing oil in the pipe 1.

At this point it may be observed that a substantial advantage is gained at an initial stage in the settling or dewaxing compartment 11, where a free counterflow of wax and oil solution immediately removes most of the oil from the wax. This desirable quiescent settling in the compartment 11 is not disturbed by the oily solvent descending from the higher scrubbing zone. Since the descending solvent is diverted into the other settling compartment 13 it does not mix with the outgoing dewaxed solution in the pipe 14, and it permits free return of wax particles that may be carried into said settling compartment 13.

The velocity and time of the cleansing action may be regulated to separate all of the oil carried by the wax, or any desired percentage of oil may be discharged with the wax, depending upon the commercial requirements. The scrubbed wax particles are discharged in the form of a slurry through a pipe 23 leading from the top of the chamber 12 where rotary blades 24 on the shaft 19 tend to centrifugally impel the slurry toward the outlet. This outgoing material can be immediately conducted to storage. However, in the specific example illustrated in the drawing, the pipe 23 discharges into an open tank 25 to provide a bulk supply for a pump 26 which forces a continuous stream of the slurry into the lower portion of a supplemental cleansing chamber. This chamber is in the form of a column 27 covered with insulation and having an inlet near the top for a stream of solvent which enters through a pipe 28. This solvent conforms to the requirements heretofore pointed out, and it may be cooled to the operating temperature by passing through a cooler or chiller 29.

The column 27 may be equipped with baffles 17' and 18', scrapers 20' and 21', and discharge blades 24' on a shaft 19', having the functions of corresponding elements previously described in referring to the column 12.

The wax particles rise through the descending stream of fresh solvent in the supplemental cleansing column 27, thereby more completely washing away traces of oil carried with the wax. This descending solvent containing a small percentage of oil, can be conveniently pumped through the pipe 16 leading from the bottom of column 27 to the upper portion of the column 12.

All of the incoming solvent could be admitted as a constant stream through the pipe 28, but in some cases an advantage is gained by introducing a portion of the solvent through the pipe 15. The incoming fresh solvent can be thus employed to very effectively cleanse the outgoing wax before said solvent enters into the stream of incoming oil. Another advantage appears in the convenient recovery of a small percentage of valuable oil which is carried by the solvent to the incoming supply of oil.

The outgoing wax product, while still in a cold condition can be subjected to a simple straining or filtering operation for the purpose of separating free liquid from the wax. For example, the wax slurry may be discharged through a pipe 30 leading to a strainer 31 where free solvent is separated from the wax product which passes out through a conductor 32 while the solvent may be pumped through a pipe 33 leading to the pipe 16.

The conditions as to temperature velocity, etc., in the supplemental cleansing column 27 can be separately regulated to accurately control the degree of cleansing, thereby providing for any desired degree of purity in the wax, and at the same time avoiding undue escape of oil which in some cases is the most valuable product. Moreover, the refining operations accurately controlled in this manner tend to reduce the total manufacturing cost of the refined oil and wax.

The temperatures in the dewaxing zones and deoiling zones may be approximately the same as the temperature at which the wax is precipitated in the original solution, but variations in the temperatures are permissible where they do not result in objectionable changes in the condition of the wax particles.

At these temperatures, the selected wax particles are precipitated in any suitable solution having the required properties, and thereafter subjected to any suitable cleansing solvent having an affinity for the solution greater than the affinity of the wax for said solution. When this process is employed to dewax oils having paraffinic and naphthenic constituents, the precipitating solvent will have an affinity for the oil greater than the affinity of the wax for the paraffinic oil constituents, so as to dissolve the paraffinic oil without dissolving the paraffinic wax.

We claim:

1. In an apparatus for separating wax-containing material wherein said material is mixed with a selective solvent and cooled to precipitate wax particles in the solution, a separating chamber having an inlet for the mixture of solution and wax particles, said separating chamber also having an outlet lower than said inlet to provide for the discharge of relatively heavy descending solution, and a wax outlet higher than said inlet to provide for the discharge of the relatively light wax, means for introducing a stream of relatively heavy cleansing solvent into the rising mass of wax particles at a point between said inlet and the wax outlet, and means for diverting said cleansing solvent from said inlet and lower outlet, the last mentioned means having an outlet for the cleansing solvent.

2. In an apparatus for separating wax-containing material wherein said material is mixed with a selective solvent and cooled to precipitate wax particles in the solution, a separating chamber having an inlet for the mixture of solution and wax particles, said separating chamber also having an outlet lower than said inlet to provide for the discharge of relatively heavy descending solution, and a wax outlet higher than said inlet to provide for the discharge of the relatively light wax, means for introducing a stream of relatively heavy cleansing solvent into the rising mass of wax particles at a point between said inlet and the wax outlet, and means for diverting said cleansing solvent from said inlet and lower outlet, the last mentioned means including a compartment located in the lower portion of said separating chamber, said compartment being open at the top to receive said cleansing solvent and provided with a lower outlet for said cleansing solvent.

3. In an apparatus for separating wax-containing material wherein a stream of said wax-containing material is mixed with a stream of selective solvent and cooled to precipitate wax particles in the solution, a separating chamber having a cleansing compartment and a settling compartment located below and communicating with said cleansing compartment, said settling compartment being provided with an inlet for the cooled mixture of solution and light wax particles and an outlet lower than said inlet to provide for the discharge of relatively heavy descending solution, the upper portion of said cleansing compartment having a wax outlet for the discharge of the relatively light wax, means for introducing a stream of relatively heavy cleansing solvent into said cleansing compartment at a point between the top of said settling compartment and the wax outlet, means for diverting said cleansing solvent from said settling compartment, and means for transmitting a stream of said diverted cleansing solvent to the first mentioned stream of wax-containing material.

4. In an apparatus for using selective solvents to separate constituents of lubricating oils, a separating chamber, a settling compartment in the lower portion of said separating chamber, said settling compartment being open at the top to communicate with the upper portion of said separating chamber, said settling compartment having an intermediate inlet for the admission of the lubricating oil stock and selective solvent and a lower outlet for the discharge of relatively heavy solution, the lighter material being free to rise through the open top of said compartment, means for introducing a stream of selective solvent into said lighter material at the upper portion of said separating chamber to transmit a descending stream of solvent through the rising material, and means for diverting said descending stream from the open top of said settling compartment, the last mentioned means including a second settling compartment adjacent to the first mentioned settling compartment, said second compartment being open at the top to receive said descending stream and provided with a lower outlet for the discharge of the descending stream.

5. In an apparatus for continuously dewaxing oil and deoiling the wax, means for dissolving wax-containing oil in a selective dewaxing solvent, a cooler wherein the solution is cooled to precipitate relatively light wax in the liquid solution of oil and solvent, releasing means whereby the major portion of the liquid solution is immediately released from the relatively light wax, so as to immediately dewax said major portion of the liquid solution, said releasing means including a dewaxing compartment having an inlet communicating with said cooler to receive the mixture of liquid solution and wax, said dewaxing compartment also having an outlet for the dewaxed solution lower than said inlet to provide for immediate discharge of relatively heavy dewaxed solution, deoiling means comprising a deoiling compartment having a wax inlet communicating directly with the upper portion of said dewaxing compartment to receive a rising stream of relatively light wax particles, the upper portion of said deoiling compartment having an outlet for the cleansed wax particles, means for introducing a descending stream of relatively heavy deoiling solvent into the rising stream of wax in said deoiling compartment, and means for diverting said descending stream of deoiling solvent from said dewaxing compartment, the last mentioned means having an outlet for the deoiling solvent.

6. In an apparatus for continuously dewaxing oil and deoiling the wax, means for dissolving wax-containing oil in a selective dewaxing solvent, a cooler wherein the solution is cooled to precipitate relatively light wax in the liquid solution of oil and solvent, breaking means associated with said cooler to forcibly break the precipitated wax into minute particles in said liquid solution, releasing means whereby the major portion of the liquid solution is released from the relatively light minute wax particles, so as to dewax said major portion of the solution, said releasing means including a dewaxing compartment having an inlet communicating with said breaking means to receive the mixture of liquid solution and minute wax particles, said dewaxing compartment also having an outlet for the dewaxed solution lower than said inlet to provide for immediate discharge of relatively heavy dewaxed solution, deoiling means comprising a deoiling compartment communicating with the upper portion of said dewaxing compartment to receive a stream of relatively light minute wax particles, the upper portion of said deoiling compartment having an outlet for the cleansed minute wax particles, means for introducing a descending stream of relatively heavy deoiling solvent into the rising stream of minute wax particles in said deoiling compartment, and means for diverting said descending stream of deoiling solvent from said dewaxing compartment, the last mentioned means having an outlet for the deoiling solvent.

7. In an apparatus for continuously dewaxing oil and deoiling the wax, means for dissolving wax-containing oil in a selective dewaxing solvent, a cooler wherein the solution is cooled to precipitate relatively light wax in the liquid solution of oil and solvent, releasing means whereby the major portion of the liquid solution is immediately released from the relatively light wax and thereby dewaxed without requiring filtration of said major portion of the solution, said releasing means including a dewaxing compartment having an inlet communicating with said cooler to receive the mixture of liquid solution and wax, said dewaxing compartment also having an outlet for the dewaxed solution lower than said inlet to provide for immediate discharge of the dewaxed solution, and deoiling means comprising a deoiling compartment communicating with the upper portion of said dewaxing compartment to receive a rising stream of relatively light wax particles, the upper portion of said deoiling compartment having a wax outlet for the discharge of cleansed wax particles, said deoiling compartment being provided with alternating baffles arranged to form a tortuous, zigzag deoiling passageway for the wax particles rising toward said wax outlet, means for introducing a stream of relatively heavy deoiling solvent into said deoiling compartment at a point above said baffles to produce a descending deoiling stream contacting with and intersecting the wax particles rising from the baffles, the tortuous deoiling passageway formed by said baffles providing free paths for the cleansing flow due to different specific gravities of the counterflowing streams, and scrapers associated with said baffles to remove waxy material extending therefrom.

8. In an apparatus for continuously dewaxing oil and deoiling the wax, means for dissolving wax-containing oil in a selective dewaxing solvent, a cooler wherein the solution is cooled to precipitate relatively light wax in the liquid solution of oil and solvent, releasing means whereby the major portion of the liquid solution is immediately released from the relatively light wax, so as to immediately dewax said major portion of the liquid solution, said releasing means including a dewaxing compartment having an inlet communicating with said cooler to receive the mixture of liquid solution and wax, said dewaxing compartment also having an outlet for the dewaxed solution lower than said inlet to provide for immediate discharge of relatively heavy dewaxed solution, deoiling means comprising a deoiling compartment having a wax inlet communicating directly with the upper por-inlet communicating with said cooler to receive a rising stream of relatively light wax particles, the upper portion of said deoiling compartment having an outlet for the cleansed wax particles, means for introducing a descending stream of relatively heavy deoiling solvent into the rising stream of wax in said deoiling compartment, means for diverting said descending stream of deoiling solvent from said dewaxing compartment, the last mentioned means having an outlet for the deoiling solvent, and conductors leading from the last mentioned outlet to the first mentioned means, so as to transmit the used deoiling solvent to said wax-containing oil.

EDDIE M. DONS.
OSWALD G. MAURO.